United States Patent
Shraim et al.

(10) Patent No.: US 10,339,300 B2
(45) Date of Patent: Jul. 2, 2019

(54) ADVANCED PERSISTENT THREAT AND TARGETED MALWARE DEFENSE

(71) Applicant: Binary Guard Corp., Germantown, MD (US)

(72) Inventors: Ihab Shraim, Germantown, MD (US); Allen E. Chen, Germantown, MD (US); Stanislav Datskovskiy, Riverdale, MD (US); Jordan R. Hannes, Shepherdstown, WV (US); Daniel M. Marcus, Sterling, VA (US); Ray R. Reese, III, Glen Burnie, MD (US)

(73) Assignee: Binary Guard Corp., Germantown, MD (US)

( * ) Notice: Subject to any disclaimer, the term of this patent is extended or adjusted under 35 U.S.C. 154(b) by 408 days.

(21) Appl. No.: 15/076,419

(22) Filed: Mar. 21, 2016

(65) Prior Publication Data

US 2017/0243000 A1  Aug. 24, 2017

Related U.S. Application Data

(60) Provisional application No. 62/136,778, filed on Mar. 23, 2015.

(51) Int. Cl.
| | |
|---|---|
| *G06F 21/00* | (2013.01) |
| *G06F 21/53* | (2013.01) |
| *G06F 21/56* | (2013.01) |
| *H04L 9/00* | (2006.01) |

(52) U.S. Cl.
CPC ............ *G06F 21/53* (2013.01); *G06F 21/566* (2013.01); *H04L 9/00* (2013.01); *G06F 2221/033* (2013.01); *H04L 2209/16* (2013.01)

(58) Field of Classification Search
CPC .. G06F 21/53; G06F 21/566; G06F 2221/033; H04L 9/00; H04L 2209/16
See application file for complete search history.

(56) References Cited

U.S. PATENT DOCUMENTS

| | | | | |
|---|---|---|---|---|
| 8,689,333 | B2 * | 4/2014 | Aziz | G06F 9/45537 726/24 |
| 9,311,479 | B1 * | 4/2016 | Manni | H04L 63/1433 |
| 9,430,646 | B1 * | 8/2016 | Mushtaq | G06F 21/554 |
| 9,438,622 | B1 * | 9/2016 | Staniford | H04L 63/1416 |
| 9,934,381 | B1 * | 4/2018 | Kindlund | H04L 63/1441 |
| 9,973,531 | B1 * | 5/2018 | Thioux | H04L 63/1466 |
| 10,210,329 | B1 * | 2/2019 | Malik | G06F 21/554 |

* cited by examiner

*Primary Examiner* — Beemnet W Dada
(74) *Attorney, Agent, or Firm* — Adsero IP

(57) ABSTRACT

Novel tools and techniques are implemented for providing computer security. In various embodiments, a computer system might receive data from one or more data feeds, might obtain a binary object based on the data, might load the binary object onto a sandboxed system, and might execute the binary object with the sandbox system. The computer system might analyze operation of the sandboxed system to determine whether the binary object includes a malware payload, and might, based on a determination that the binary object includes a malware payload, generate a report indicating that the binary object includes a malware payload.

60 Claims, 8 Drawing Sheets

ADVANCED PERSISTENT THREAT AND TARGETED MALWARE DEFENSE

CROSS-REFERENCES TO RELATED APPLICATIONS

This application is a non-provisional application of U.S. Patent Application No. 62/136,778 (the "'778 Application") filed Mar. 23, 2015 by Ihab Shraim et al. and titled, "Advanced Persistent Threat and Targeted Malware Defense", which is hereby incorporated by reference in its entirety.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BRIEF SUMMARY

A set of embodiments provides novel solutions for computer security, including in particular solutions to address malware, targeted malware advanced persistent threats ("APT"), and other security intrusions.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible and/or non-transitory computer readable media (such as, to name but a few examples, optical media, magnetic media, and/or the like).

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
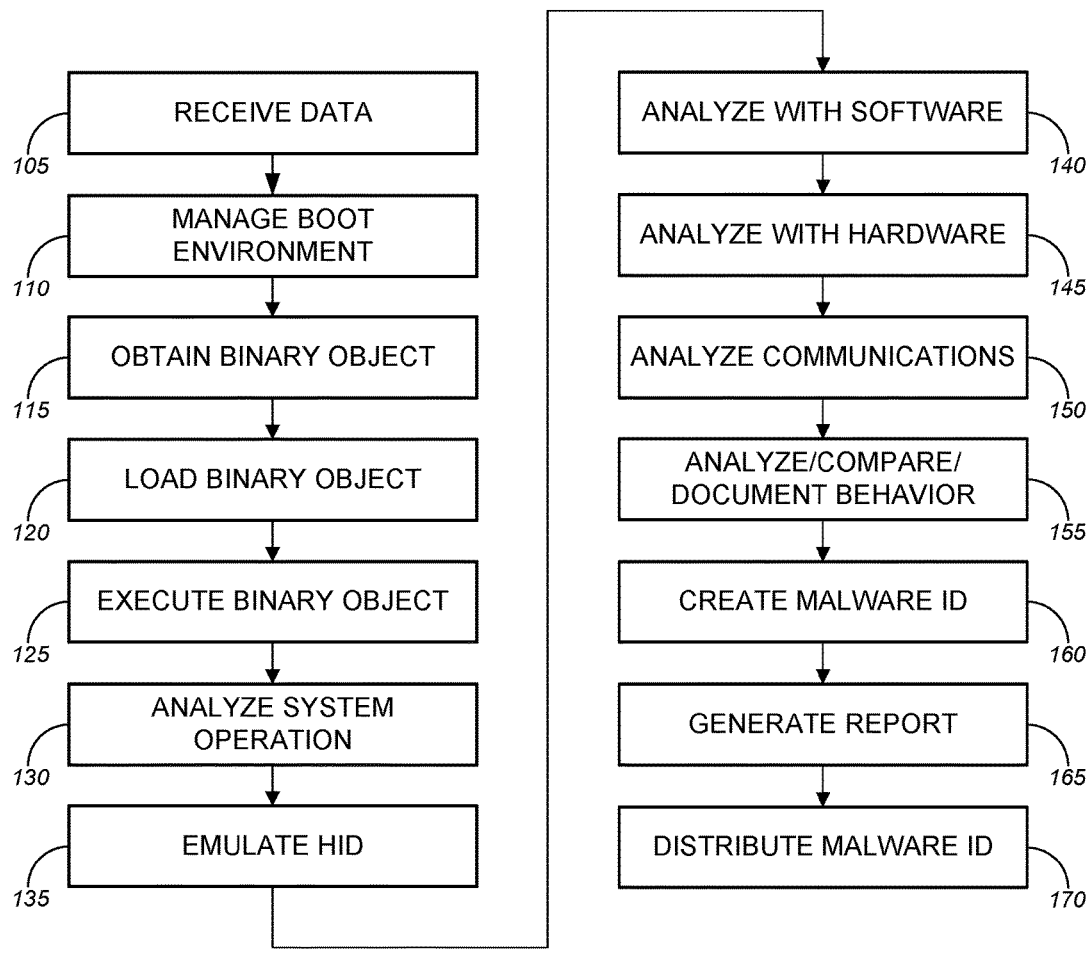
FIG. 1 is a process flow diagram illustrating a method of opposing security threats, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Some embodiments provide a variety of tools and techniques (including, without limitation, methods, systems, devices, and/or software) that collectively can provide comprehensive strategies against a variety of computer threats, such as malware, APT, VIP impersonation, web browser hijacking, and other threats. The description below and the Appendix to the '778 Application (the '778 Application and its Appendix being incorporated herein by reference in their entirety) describe a variety of different embodiments and technologies, all of which can be used alone and/or in conjunction. Various features of these technologies can be combined as desired in accordance with different embodiments, and no single embodiment should be considered to be limited to any particular set of features or technologies.

FIGS. 1-5 illustrate various methods that can be used to provide computer security. While the methods of FIGS. 1-5 are illustrated, for ease of description, as different methods, it should be appreciated that the various techniques and procedures of these methods can be combined in any suitable fashion, and that, in some embodiments, the methods depicted by FIGS. 1-5 can be considered interoperable and/or as portions of a single method. Similarly, while the techniques and procedures are depicted and/or described in a certain order for purposes of illustration, it should be appreciated that certain procedures may be reordered and/or omitted within the scope of various embodiments. Moreover, while the methods illustrated by FIGS. 1-5 can be implemented by (and, in some cases, are described below with respect to) the systems of FIGS. 6-8 (or components thereof), these methods may also be implemented using any suitable hardware implementation. Similarly, while the systems of FIGS. 6-8 (and/or components thereof) can operate according to the methods illustrated by FIGS. 1-5 (e.g., by executing instructions embodied on a computer readable medium), the systems can also operate according to other modes of operation and/or perform other suitable procedures.

Each of the methods of FIGS. 1-5 can employ various procedures, examples of many of which are described in more detail in the Appendix to the '778 Application, but it should be appreciated that neither the Appendix to the '778 Application nor the illustrated methods themselves should be considered limiting with regard to any particular embodiment. Notably, for example, while many of the operations of FIGS. 1-5 are described in conjunction with a management computer or a sandboxed system, it should be appreciated that these operations can be performed on any type of computer (whether sandboxed or not), including desktop and/or laptop computers running any of a variety of operating systems (e.g., different versions of Microsoft Windows™, Apple OS X™, UNIX™ or UNIX-like (e.g., Linux™) operating systems), server computers running server operating systems, handheld devices, mobile phones, tablet computers, and/or the like. A system to perform these methods can be operated from a provider data center (e.g., as software as a service ("SaaS")), can be implemented as an appliance at a customer location, and/or can take any other form. In some cases, the operations can be performed by a combination of components. For example, an installable hardware appliance might include one or more sandboxed systems, a management computer, a HID emulator, and a monitored gateway (all of which are described further below and in the Appendix to the '778 Application), and it might send collected data on potential malware behavior to a remote server operated by a service provider for further analysis. In other cases, the appliance might perform such analysis itself, e.g., based on operating system images, signatures, and/or heuristics provided by the service provider.

As a mechanism for collecting candidates for malware analysis, the system can include one or more software and/or hardware appliances (referred to as sensors or sensors/appliances) residing within one or more customer networks. By virtue of being inside the customer network, sensors have the ability to access certain streams of data that may be useful for detection of malicious behavior. For example, a sensor/appliance might be in communication with, or integrated with, an email server to allow for analysis of email bodies and attachments to and/or from users on the customer network. A sensor/appliance might be in communication with, or integrated with, a web proxy to provide access to URLs and files downloaded by users within the network. Other sensors/appliances that might be integrated might be in communication with, or integrated with, the network and system log aggregators, such as syslog, Splunk, etc. Sniffing Internet traffic can also provide access to URLs and files. Further sensors/appliances might be in communication with, or integrated with, Security Information and Event Mangers (SIEMs) and other well-known monitoring event managers. Any number of these sensors/appliances can be used in a customer network, and such sensors might be combined into a single appliance, integrated with customer devices, and/or otherwise arranged as desired according to different implementations. Moreover, several sensors/appliances, or sets of sensors/appliances, might be employed across networks of different customers.

The sensor/appliance, as part of a SaaS model, can securely transmit the data to a service provider's cloud-hosted malware analyzers via an encrypted VPN tunnel and other secure encrypted mechanisms. Alternatively and/or additionally, the sensor/appliance can be equipped with TBM1/TBM2 technology for on-site processing. The sensor/application can function independently or as part of the SaaS model. Moreover, the sensor/appliance can work with any AV agent residing on client computers (servers and laptops, or the like). Such equipment is considered as part of the customer's network infrastructure.

A sensor can also integrate with the customer's network and security infrastructure to automate the process of blocking malicious activity as soon as it is detected. A sensor/appliance may be further extended with functionality of common network or security infrastructure, such as firewalls, web proxies, Intrusion Detection Systems (IDS), Intrusion Prevention Systems (IPS), etc.

Certain embodiments can be used to analyze binary objects to determine whether such objects can include malware or other threats. Binary objects can include, but are not limited to, email attachments, downloaded applications ("apps"), programs, media files (e.g., videos, photos, music files, etc.), PDF documents, documents (e.g., .doc, .xls, etc.) created by desktop office applications, compressed (e.g., .zip) files masquerading as any of these, and/or any other file that potentially can include executable malware or other APT, or the like. In addition to analyzing binary files, the system can also be used to analyze URLs. A certain class of malware exists called drive-by malware such that the simple act of visiting a malicious URL is enough to infect a computer, typically with no user knowledge. (No subsequent user actions like downloading or executing a file are needed.) The system thus can analyze URLs for drive-by attacks by visiting the URL with a browser on the sandboxed computer. It then monitors the browser (and the rest of the system) as if it were the binary sample being analyzed in the first use case. Thus, when this document describes analysis of a binary object or the operation of a sandboxed (or other) system during execution of a binary object, this description also applies to analysis of a browser visiting a malicious URL.

For example, FIG. 1 illustrates a method 100 of protecting against threats, such as malware, APT, and the like. The method 100 might comprise receiving, e.g., at a computer system, data from one or more data feeds (block 105). Different embodiments can receive a number of different types of data feeds, including, without limitation, those described in the Appendix to the '778 Application. Merely by way of example, feeds from sensors/appliances can serve as data feeds. Alternatively and/or additionally, a "honeypot" technique can be used to attract email messages from scammers, and these messages (and any attachments thereto) can be considered part of the data feed. Another data feed might be based on web browsing (either by an actual user or by an automated process, such as a web crawler), including any files downloaded during a browsing session. Virtually any process that can produce binaries can be used as a data feed, and a variety of different data feeds can be combined into an integrated data feed.

The method 100 can further comprise managing a boot environment for one or more computers used to analyze malware (block 110). Merely by way of example, systems in accordance with certain embodiments can employ "sandboxed" systems that are designed to test malware. Such systems can have two particular characteristics, in some aspects of various embodiments.

First, a sandboxed system might be isolated, such that execution of malware on the sandboxed system cannot permanently harm the sandboxed system or any other computer. Thus, for example, the sandboxed system might have no fixed hard drive to which malicious code can be written, and as such might, for example, boot from a network drive that does not accept (or will accept that can later revert) any write operations from the code running on the sandboxed system.

Second, the sandboxed system can be specially configured to appear to any executable malware to be a normal computer, such that the malware cannot detect technology on the sandboxed system that is designed to monitor and/or analyze the operation of the system while the malware is executing. In particular, as described in the Appendix to the '778 Application, many instances of malware are designed to detect that they are installed on a virtual machine or an emulated system, and will refuse to execute on such systems, in order to avoid detection and/or analysis. Thus, certain embodiments employ sandboxed systems that run on "bare metal," in that they are custom computers that do not feature any emulation and run a host operating system directly at the hardware, with no hypervisors or any other intermediation layer. The TBM1 and TMB2 systems described in further detail in the Appendix to the '778 Application can be employed as sandboxed systems in accordance with various embodiments.

In many cases, a malware detection system might employ a plurality of sandboxed systems simultaneously and/or in parallel (e.g., under the control of a management computer), and in cases where the sandbox systems are not virtual machines, each sandboxed system generally is a custom computer with its own hardware. Therefore, traditional installation of an operating system (which may subsequently be damaged by a malware infection) can present unacceptable delays in the detection and analysis of malware infections. Accordingly, some embodiments of the method 100 can manage the boot environment of each sandbox system in a variety of different ways to enhance the efficiency of the analysis process.

Figure 2:
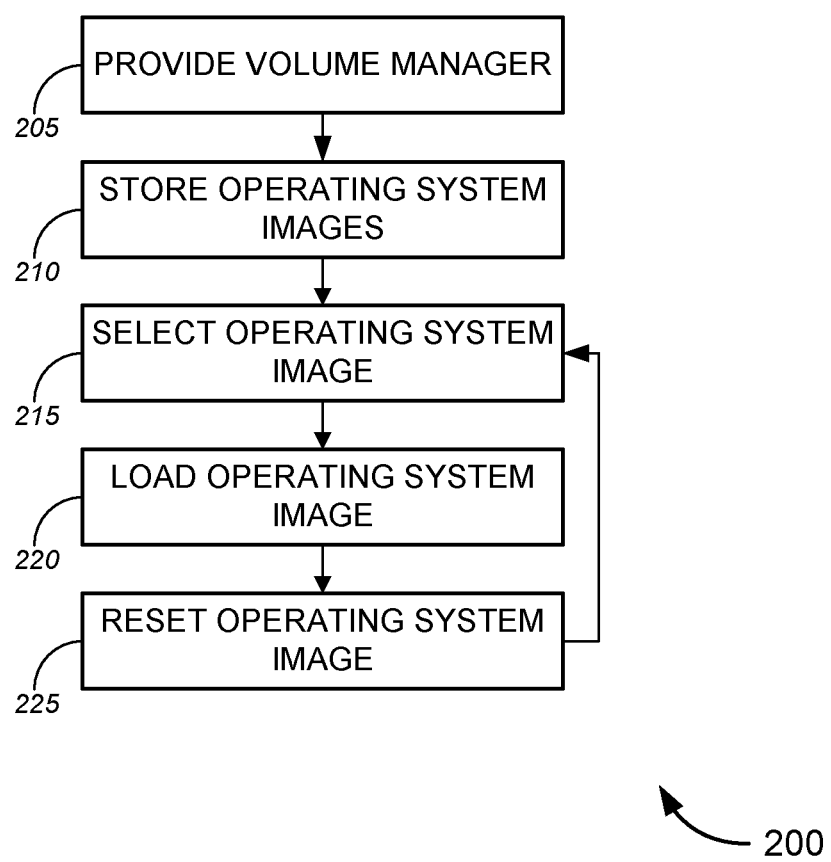
FIG. 2 is a process flow diagram illustrating a method of managing a boot environment, in accordance with various embodiments.

Managing a boot environment can comprise any of a number of operations. Merely by way of example, FIG. 2 illustrates a method 200 of managing a boot environment for a computer. Various operations of this method 200 can be used, for example, to manage a boot environment for each of one or more sandboxed systems. In some cases, the boot environment of a sandboxed system (or other computer) might include a networked drive mountable by a network block device protocol (such as Internet Small Computer System Interface ("iSCSI"), an IP-based storage networking standard for linking data storage devices with computers), and/or the sandboxed system does not include a physical hard drive. Consequently, the method 200 can include providing a volume manager (such as ZFS, which can serve as a volume manager and file system for a networked drive, or array of networked drives), at block 205. Providing a volume manager might comprise operating a volume manager, providing connectivity between the volume manager and one or more computers (such as sandboxed systems, etc.), and/or the like.

The method 200 can further comprise storing one or more operating system images with the volume manager (block 210), which can allow a sandboxed computer (or other device) to load one of the operating system images and boot from that image (into the operating system instance represented by the image). Hence, the method 200 can further include selecting an operating system image for a sandboxed computer to boot from (block 215). In some cases, each of the operating system images might include a different malware scenario (e.g., a different binary object loaded into the image, or the same binary loaded a different way or in a different state), and the method can include loading the selected image and/or booting a system (e.g., a sandboxed system) from the selected image (e.g., via a network boot procedure), at block 220. In some cases, the method 200 can include, at block 225, automatically resetting an operating system image to a default state (which might include disallowing the writing of changes to the image on the volume manager). This default state might (or might not) include the binary image itself, so, for example, the same image might be booted multiple times, from the same state, by different sandboxed computers, to examine the binary under different conditions, while starting from an identical state. Alternatively and/or additionally, in one embodiment, the sandboxed computer can restore a memory image of an already booted instance of the operating system directly into RAM. This allows rapid restoration of the machine to its default state. In one embodiment, the restore takes place using a custom memory controller chip, which, for example, could reserve one half of attached RAM for the purpose of keeping such a memory image; the fact of this modification is invisible to the operating system and to any malware infecting the latter.

Hence, the volume manager can be used to store a plurality of images, each including a different binary object, or including one or more binary objects in different states, to allow different sandboxed computers to test different malware scenarios. For instance, one image might include a binary downloaded from an email attachment, and the sandboxed system could open the attachment to analyze the behavior of the binary to determine whether it contained malware, while a different image might include the same binary that is treated differently by another sandboxed system, while a third image might include a completely different binary to be executed by yet a third sandboxed system.

This arrangement can provide the sandboxed system with a simulated hard drive that is indistinguishable, by an operating system of the sandboxed system, from a physical hard drive. In some cases, the simulated hard drive comprises a hard drive controller and a network controller in communication with the hard drive controller. For example, the hard drive controller can cause the network controller to perform network input/output in response to receiving disk input/output commands from the operating system of the sandboxed system. In one embodiment, the simulated hard drive is not implemented as a separate hardware device but rather as an integral part of the computer's motherboard.

Returning to FIG. 1, the method 100 can comprise obtaining, with a computer system (e.g., a management computer or another computer), a binary object based on the data from the data feed(s). Obtaining a binary object can take a variety of forms, often depending on the nature of the data feed that includes the binary object. Merely by way of example, if the data feed includes an email message with a binary attachment, obtaining the binary can comprise receiving the email message, forwarding the email message, downloading the binary object, etc. If the data feed includes a URL, obtaining the binary object can include downloading the object from the URL, etc. In any case, obtaining the binary object can further include storing the binary object in a file system or a database, creating a database record about the binary object (including, e.g., the data feed from which the object was obtained, the data source or other information relating to how the binary object was obtained, etc.), and/or making the binary object available for loading on to a sandboxed system.

Turning back to FIG. 1, in some cases, the method 100 can include loading, with a computer system (e.g., a management computer), the binary object onto a computer, such as a sandboxed system (block 120). As noted above, loading a binary object onto a sandboxed system might include loading the binary object into an operating system image from which the sandboxed system boots. In other cases, the sandboxed system might be booted with a "clean" operating system, and the binary object might be loaded into memory or onto a real or virtual hard drive accessed by the running operating system.

The method 100, at block 125, can include executing the binary object with the sandbox system (or another computer system). Generally, executing the binary object will include invoking the object, e.g., by attempting to open the object for execution with the operating system, in the case of an executable, opening an actual or purported media (or other) file with an application intended to open such files, and/or the like. Essentially, executing a binary object can involve any operation that is intended to, or has the effect of, causing any malware payload of the binary object to execute. This can include, for example, in the Windows™ operating system, double-clicking (with actual user input or simulated user input, as described below) an icon that represents the binary object.

At block 130, the method 100 can include analyzing, with a computer system (such as a management computer and/or a sandboxed computer itself), operation of the sandboxed system to determine whether the binary object includes a malware payload. In some cases, analysis of the operation of the sandboxed system might include multiple machines; for example, the sandboxed computer might collect operational data on the operation of the sandboxed system and transmit that data to a management computer (or other computer) for analysis.

Analysis of the operation of a sandboxed system (or any other computer) can take a variety of forms. Merely by way of example, in some embodiments, the system includes a Human Interface Device ("HID") emulator that can simulate human user input. In a specific embodiment, the HID emulator is a hardware device (e.g., with its own microprocessor and device controllers) that plugs into input ports on the sandboxed system, such as a mouse port, keyboard port, USB port, or the like, and sends signals identical to those of traditional input devices (mice, keyboards, etc.). In another embodiment, the HID emulator is not implemented as a separate hardware device but rather as an integral part of the computer's motherboard. Hence, at block 135, the method 100 can include providing, with a HID emulator physically connected with the sandboxed system, automated input that cannot be distinguished, by the executing binary object, from human input. This input can be used to invoke the binary object and/or to provide simulated human activity while the binary object already is executing. By using a HID emulator, the system can portray normal human operation of a computer (drafting email messages, browsing the web, using desktop applications, etc.) in order to deceive any malware payload in the executing binary into perceiving the sandboxed system as a computer under normal operation. Such operations can prevent detection by a malware payload that is designed either to detect inactivity in a system or to detect artificial activity as one indicator of a malware testbed.

Figure 3:
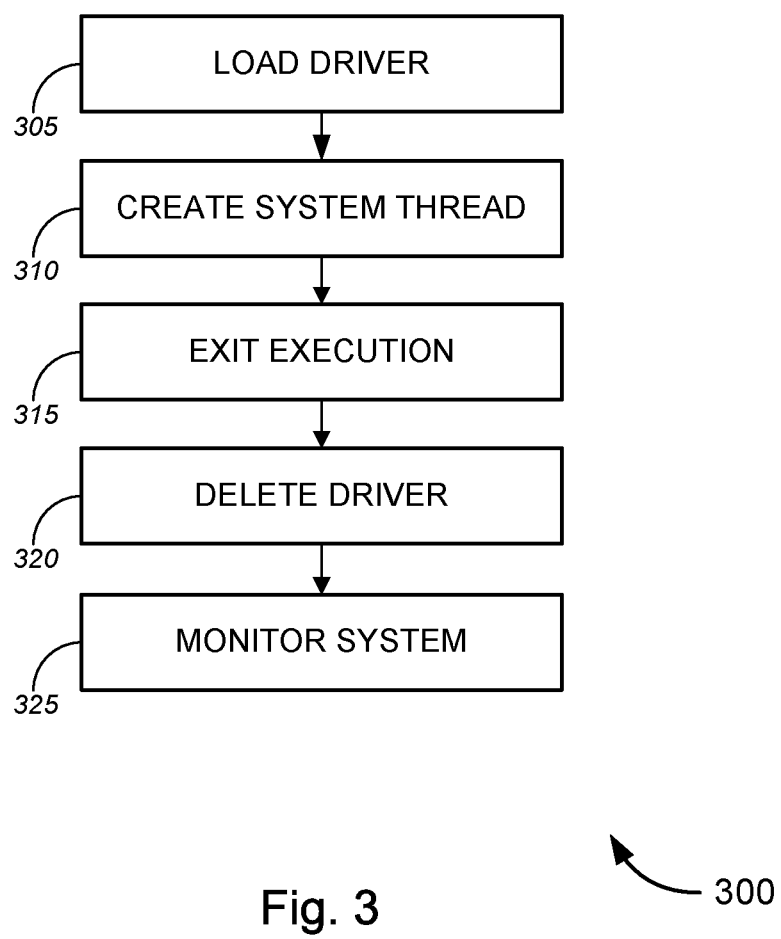
FIG. 3 is a process flow diagram illustrating a method of performing software analysis of binary object's execution, in accordance with various embodiments.

Analysis of the operation of the sandboxed system can also include software-based analysis (block 140) or hardware-based analysis (block 145), or both. For example, as described in the Appendix to the '778 Application, the TBM1 system can employ a software-based monitoring and analysis routine. One example of how this can be accomplished is depicted by FIG. 3, which illustrates a method 300 of providing a software monitor that is difficult (or impossible) for malware to detect.

For example, in some cases, the sandboxed system (and/or an operating system, such as an operating system booted from an image in a volume manager, as described above), might employ a proprietary and/or obfuscated kernel-mode driver to monitor the sandbox system for suspicious events, such as those triggered by a malware attack. In some embodiments, the sandboxed system, or the proprietary and/or obfuscated kernel-mode driver, might stream monitored data in real time. The method 300 can include dynamically loading the driver (e.g., in a Windows™ system, a boot DLL) at startup of the sandboxed system (block 305). The driver can then create a system thread (block 310) and then exit (in some cases, immediately and/or before the binary object is executed) (block 315). The system thread can then delete the driver (block 320), again perhaps immediately and/or before the binary object executes. This deletion operation prevents any tangible evidence of a driver that might be detected by a malware payload, again deceiving the malware by appearing to be an unmonitored computer system. However, because the operating system remains static (or can be restored) on the volume manager, the driver will still be available the next time a sandboxed system is booted from the image. The system thread, which executes in memory but has no traceable evidence on the sandboxed system, can then monitor operation of the system for suspicious activity when the binary object executes (block 325) to detect any malware activity.

Additionally and/or alternatively, hardware-based monitoring and analysis of the sandboxed system can be performed. For example, as described in the Appendix to the '778 Application with respect to the exemplary TBM2 system, the sandboxed system might comprise a direct hardware interface with a motherboard of the sandboxed system. One example of such a hardware interface is a debugger interface manufactured into a processor chipset and/or motherboard of the sandboxed system. Accordingly, analyzing operation of the sandboxed system can include analyzing output from the hardware interface (e.g., a hardware debugger interface). In many cases, this hardware debugger is invisible (by manufacturer design) to the operating system running on the sandboxed system and is therefore also undetectable by any software applications (including any malware) running in the operating system on the sandboxed system. Thus, for example, if the malware payload is a boot sector infector or a firmware-based rootkit, a hardware-based monitoring scheme can detect the malware payload though the hardware interface, in situations in which software-based monitoring alone might not be able to detect such malware (perhaps because the malware, which executes on boot, might detect the invocation of the software-based monitoring routines).

Figure 4:
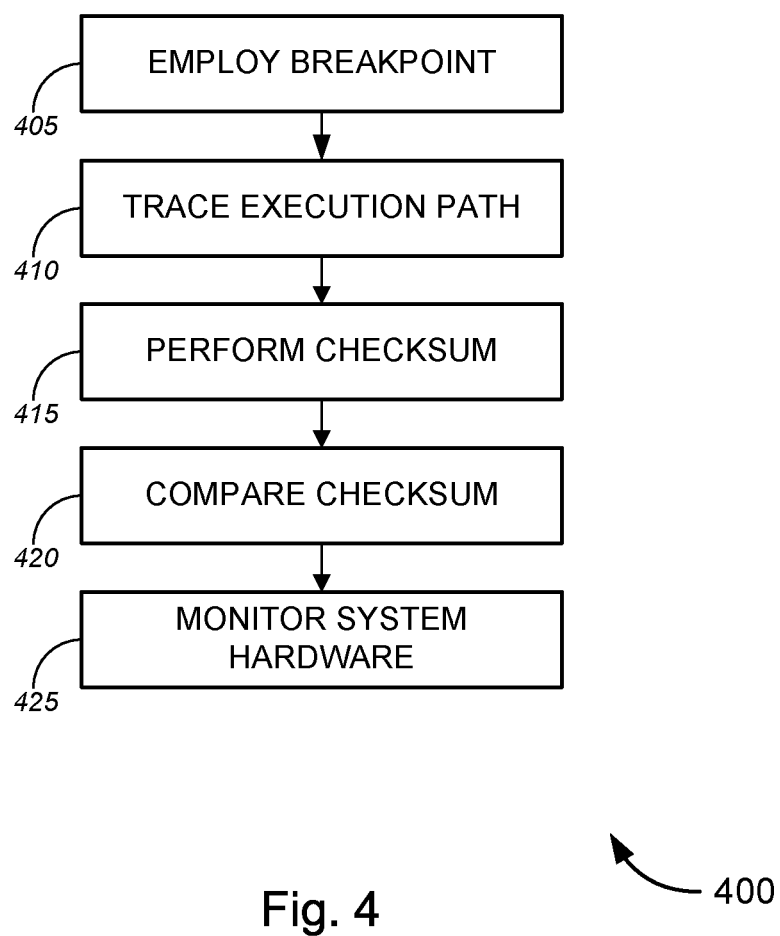
FIG. 4 is a process flow diagram illustrating a method of performing hardware analysis of binary object's execution, in accordance with various embodiments.

Such a hardware interface can provide multiple methods to monitor and/or analyze operation of the sandboxed system. Merely by way of example, FIG. 4 illustrates a method 400 depicting several operations that can be used separately or together to perform hardware-based monitoring of a sandboxed system. Merely by way of example, in some cases, the method 400 can include employing hardware breakpoints to pause operation of the sandboxed system (block 405). Moreover, analyzing operation of the sandboxed system can further comprise tracing an execution path of a processor of the sandboxed system (block 410).

In some cases, the method 400 might include operations to detect modifications of one or more firmware components of the sandboxed system (such as a BIOS, etc.), including operations by a malware payload in an attempt to reflash or otherwise modify such firmware. For example, the method 400 might comprise performing multiple checksums on the firmware (block 415), such as performing a first checksum of a firmware component of the sandboxed system before execution of the binary object and performing a second checksum of the firmware component during or after execution of the binary object. The method 400 then can further comprise comparing the first checksum with the second checksum to determine whether the firmware component has been modified (block 420). In one embodiment, the EEPROM or FLASH chip on the sandboxed system's (or other computer's) motherboard is replaced with a custom device that otherwise behaves identically to the original but that also accumulates a record of all information read or written therein in the course of an analysis run.

A hardware interface, such as in the exemplary TBM2 system, can be used for several purposes separate from malware analysis. For example, in some embodiments, the debugger can be used to assist in the search for security vulnerabilities in computer hardware devices and/or in operating systems or other software, by way of feeding streams of random or malformed commands to the latter (a practice known as "fuzzing"). In some cases, this process of fuzzing can be used as part of an analytical tool set that includes the malware detection processes described herein.

A variety of other operations can also be performed (using software-based analysis and/or hardware-based analysis on the sandboxed system and/or using other analysis techniques outside the sandboxed system). For example, the system might monitor the operation of off-processor hardware on the sandboxed system (such as network controllers, WiFi radios, and/or the like) to detect activity that would not be occurring in the absence of a malware infection (block 425). (Hardware-based solutions can be particularly effective for this type of analysis.) Sometimes, other behavior of a sandboxed system can be monitored and analyzed from outside the sandboxed system.

For example, the system might be configured so that the sandboxed system is in communication with the Internet via a monitored router or gateway. Returning to FIG. 1, in such cases, analyzing operation of the sandboxed system can include analyzing communications of the sandboxed system (block 150), such as by capturing, e.g., at such a gateway, outgoing communications of the sandboxed system and analyzing, with a computer (such as the monitoring computer or another computer), the outgoing communications, to name one example. Such analysis can include, for instance, identifying a destination of an outgoing communication from the sandboxed system. This can provide information on a possible source of a malware infection. Further, because many malware instances encrypt communications in an attempt to disguise operation and/or command-and-control channels, some or all of the outgoing (and/or incoming) communications can be decrypted (e.g., using a man-in-the-middle attack at the gateway) to identify the nature, source, and/or destination of such communications. Further, in some cases, analyzing the outgoing communications comprises identifying one or more credentials used to connect to a command-and-control channel for the malware payload, which can provide further information into the nature and/or source of the malware.

In general, therefore, many different forms of analysis can be undertaken to track the behavior of the binary object (from its behavior within the operating system to its behavior as it affects sandboxed system hardware to its communication behavior), using the known operation of a "clean" sandboxed system as a baseline. Variances in behavior from this baseline can be attributed to execution of the binary object, and any suspicious behavior can be monitored and analyzed to determine whether the binary object might include a malware payload (block 155). For example, this behavior can be compared with one or more malware signatures and/or against one or more heuristics to determine whether the behavior is evidence of a malware payload. In some embodiments, streaming data can be monitored and analyzed, in real time, for suspicious behavior and to determine whether the binary object might include a malware payload. An advantage of real time monitoring and analysis of streaming data might include the ability to make a determination of the maliciousness of a sample binary object more quickly, without having to wait for the full duration of the sandboxed session to elapse. This will also improve efficiency, allowing processing of more samples in a given amount of time.

Furthermore, this behavior can be documented for future comparisons, and if the behavior indicates a malware payload in the binary object, a malware identifier (e.g., signature) can be created from the documented behavior (block 160), e.g., if no such signature exists. Such an identifier can include a variety of information, including the documented behavior, such as an identified source of the malware, based on the data feed in which the binary was received, the destination of communications from the sandboxed system, and/or any other information ascertained from analysis of the operation of the sandboxed system.

At block 165, the method 100 can include generating a report on the existence (or nonexistence) of a malware payload in the binary object. Such a report can include any or all of the above information, and it can be presented to a user, e.g., through a threat dashboard, as described in the Appendix to the '778 Application, via email or text alert, and/or the like.

The method 100 can further include distributing the malware identifier (block 170), e.g., as described further in the Appendix to the '778 Application. In some cases, the system will include facilities for automatically distributing malware identifiers to a variety of devices, such as commercial firewalls, gateways, web browsers, and the like, that have been provided with an interface (e.g., by the manufacturer) for receiving such information. This can serve to immunize such devices to the malware attack. Thereafter, such devices can stop the intrusion of the binary into a protected network, e.g., by blocking access to a web site identified in the malware identifier as a source of the binary, by blocking email messages that include the binary as an attachment (as identified by filename, message source, binary hash value, or any other relevant identifying information), and/or the like. The malware identifier can also be distributed to appliances that provide similar functionality to the system, to anti-malware clients running on other personal computers (or other computing devices), to other anti-malware vendors, government agencies, consumer advocacy groups, and/or the like. Such distribution can be performed automatically upon creation of the malware identifier if desired.

Figure 5:
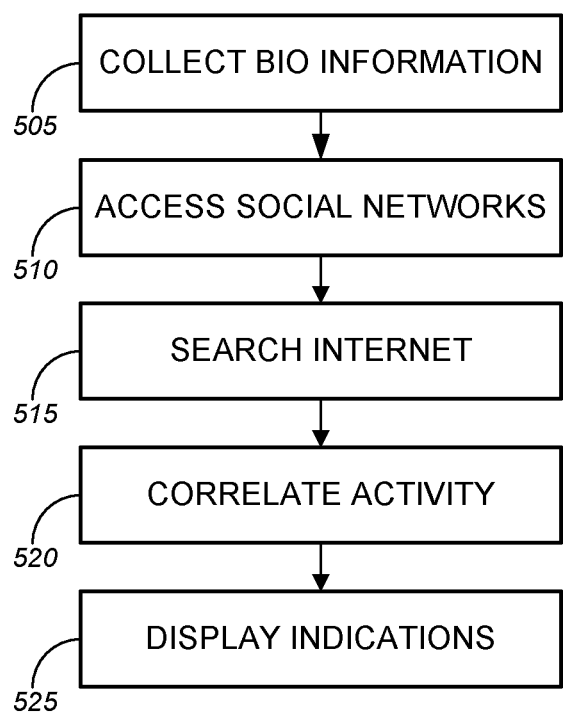
FIG. 5 is a process flow diagram illustrating a method of protecting an identity, in accordance with various embodiments.

FIG. 5 illustrates a method 500 of protecting the identity of a person, such as a famous person or a VIP at a corporation (or, for that matter, any person). The method 500 can comprise collecting, with a computer, biographical information about a person (block 505). Such biographical information comprising one or more social media handles as well as other information described in the Appendix to the '778 Application, to name a few examples. The method 500 can further comprise automatically accessing one or more social networks using the social media handles to identify unusual activity (block 510) and/or automatically searching the Internet using the biographical information (block 515). In some cases, the method 500 can include correlating the unusual activity with results of searching the Internet (block 520) and/or displaying, e.g., on a dashboard (such as the threat dashboard described above and/or the monitoring dashboards and systems described in the Appendix to the '778 Application), indications of unusual activity on the one or more social networks and correlated results of searching the Internet (block 525).

Figure 6:
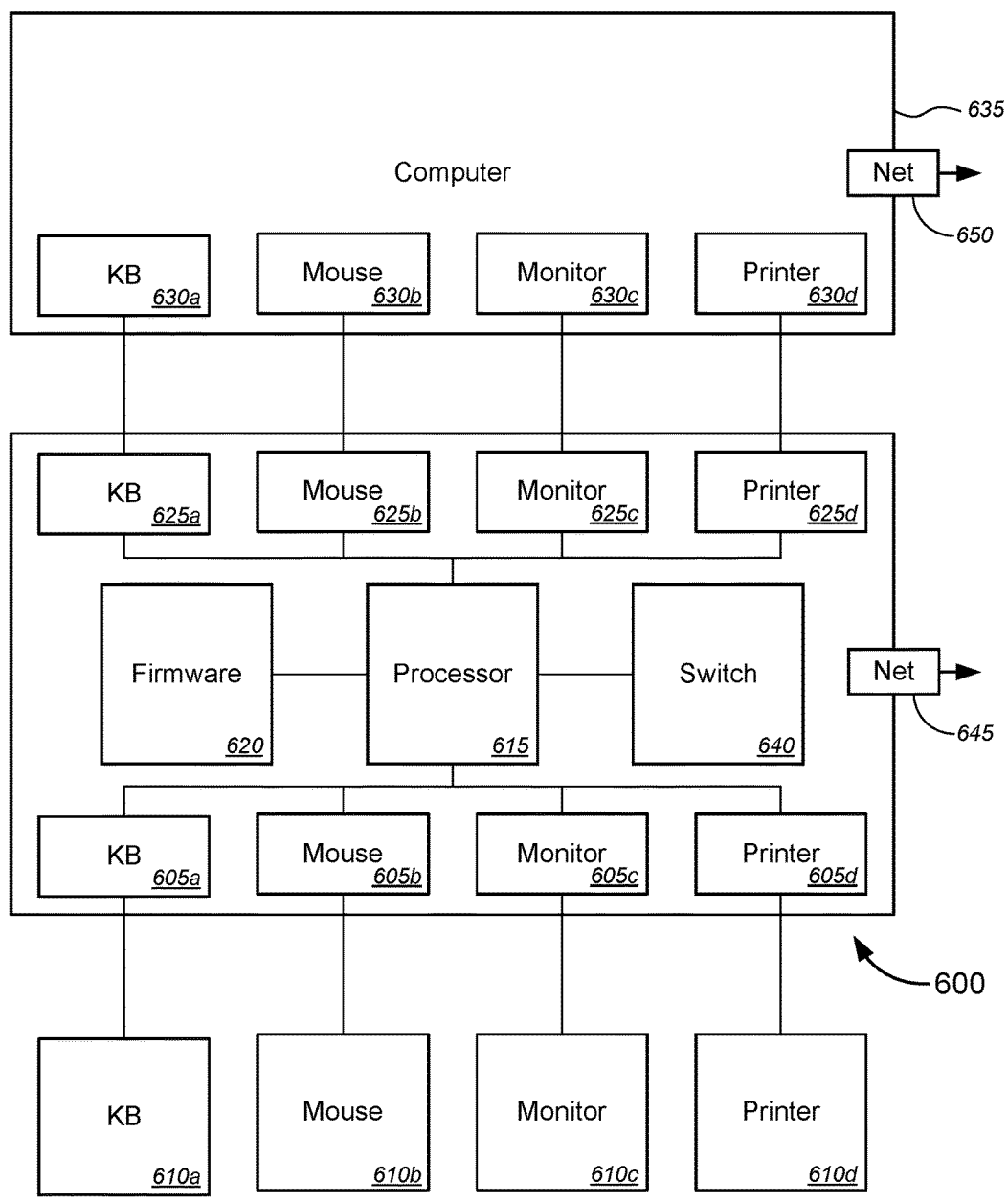
FIG. 6 is a block diagram illustrating a device for secure web browsing, in accordance with various embodiments.

FIG. 6 illustrates a device 600 that can provide secure web browsing services, as described more fully in the Appendix to the '778 Application. The device includes a first set of ports 605 for connection with a set of peripherals 610 (which can include, without limitation, a keyboard 610a, mouse 610b or other pointing device, monitor 610c, printer 610d, etc.). The device 600 can further include a processor (e.g., a microcontroller) 615 in communication with the ports 605 and with firmware 620 (or other non-writable or write-protected media) that includes instructions for the processor, including a secure web browser. The device 600 further includes a second set of ports 625, in communication with the processor 615, for corresponding connections to ports 630 on a computer 635, and a switch 640, which can be a physical switch incapable of manipulation except physically, also in communication with the processor. The device 600 can further include a network interface 645 for providing communications, e.g., with the Internet. In a particular set of embodiments, the network interface might be configured only to communicate with a hard-wired IP address of a secure gateway (and/or the network interface might be conventional, and the firmware might program the processor to allow only such communications through the network interface). This IP address might route all communications from the device 600 over a specified VPN to the secure gateway, for example. This connection might employ a curated DNS to help prevent DNS poisoning and pharming attacks, and/or the VPN might allow connections only to whitelisted IP addresses/ranges to limit exposure to the Internet as a whole. Such strategies can further protect secured browsing activities using the device 600.

In operation, the firmware 620 (or other media) can provide instructions that are executable by the processor 615 to provide, in a first configuration, a pass-through connection between the first set of ports 605 and the second set of ports 625, such that the set of peripherals 610 can communicate directly with the computer 635 for normal operation of the computer 635, including communications over a network (such as the Internet) through a network interface 650. The instructions can also be executed by the processor 615 to provide, in a second configuration, a secure browsing environment, in which the peripherals 610 communicate with the processor 615 to perform secure web browsing activities through the network interface 645 without any communication with the computer 635. In some cases the instructions can also be executed by the processor 615 to change from the first configuration to the second configuration when the switch 640 is manipulated (e.g., physically).

Figure 7:
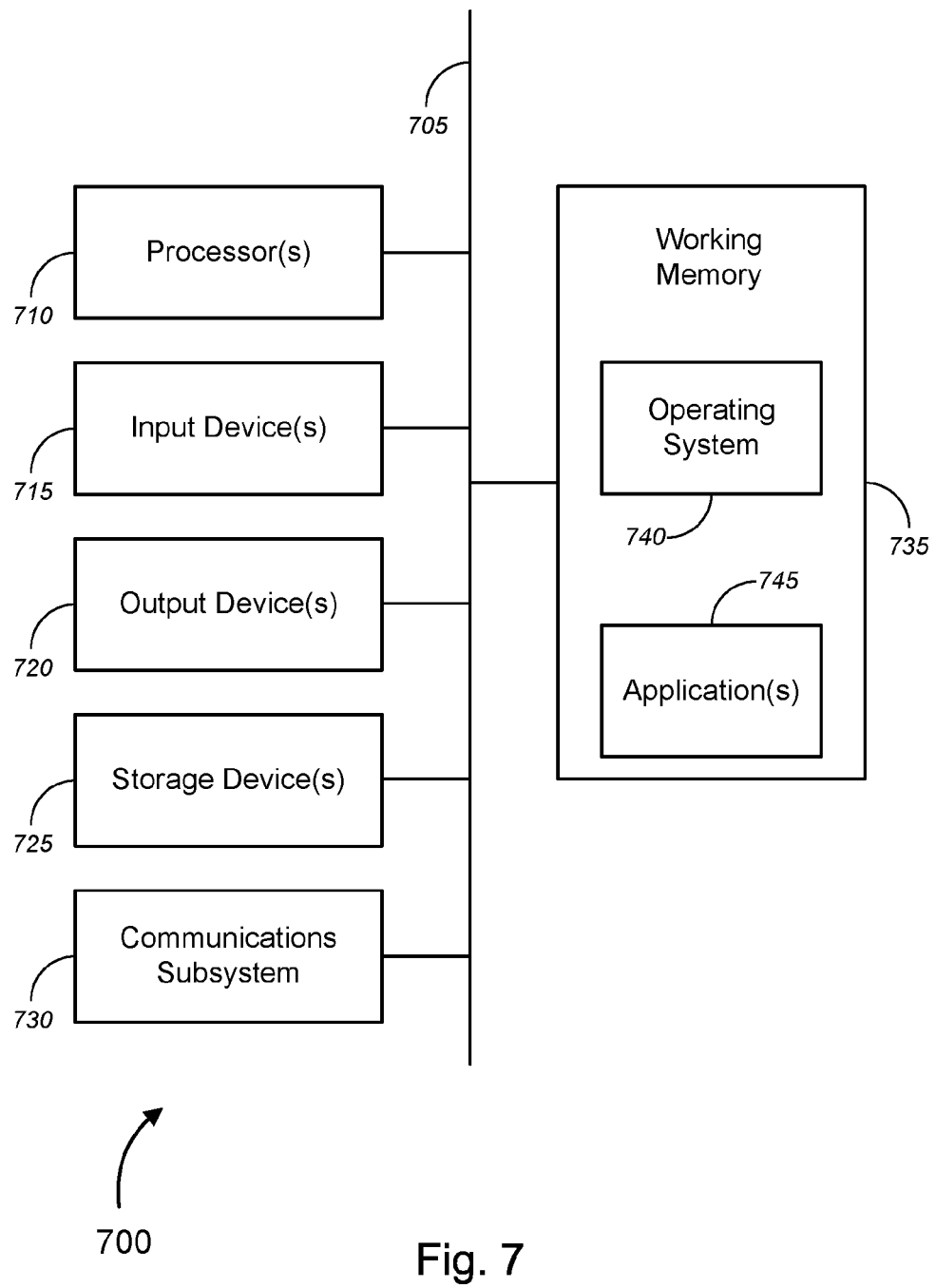
FIG. 7 is a generalized schematic diagram illustrating a computer system, in accordance with various embodiments.

FIG. 7 provides a schematic illustration of one embodiment of a computer system 700 that can perform the methods provided by various other embodiments, as described herein, and/or can function as management computer, sandboxed computer, and/or any other computer, device or system described herein. It should be noted that FIG. 7 is meant only to provide a generalized illustration of various components, of which one or more (or none) of each may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including, without limitation, one or more general-purpose processors and/or one or more special-purpose processors (such as digital signal processing chips, graphics acceleration processors, and/or the like); one or more input devices 715, which can include, without limitation, a mouse, a keyboard, and/or the like; and one or more output devices 720, which can include, without limitation, a display device, a printer, and/or the like.

The computer system 700 may further include (and/or be in communication with) one or more storage devices 725, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including, without limitation, various file systems, database structures, and/or the like.

The computer system 700 might also include a communications subsystem 730, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 730 may permit data to be exchanged with a network (such as the network described below, to name one example), with other computer systems, and/or with any other devices described herein. In many embodiments, the computer system 700 will further comprise a working memory 735, which can include a RAM or ROM device, as described above.

The computer system 700 also may comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 725 described above. In some cases, the storage medium might be incorporated within a computer system, such as the system 700. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer readable medium, such as one or more of the storage device(s) 725. Merely by way of example, execution of the sequences of instructions contained in the working memory 735 might cause the processor(s) 710 to perform one or more procedures of the methods described herein.

The terms "machine readable medium" and "computer readable medium," as used herein, refer to any medium that participates in providing data that causes a machine to operate in a specific fashion. In an embodiment implemented using the computer system 700, various computer readable media might be involved in providing instructions/code to processor(s) 710 for execution and/or might be used to store and/or carry such instructions/code (e.g., as signals). In many implementations, a computer readable medium is a non-transitory, physical and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 725. Volatile media includes, without limitation, dynamic memory, such as the working memory 735. In some alternative embodiments, a computer readable medium may take the form of transmission media, which includes, without limitation, coaxial cables, copper wire and fiber optics, including the wires that comprise the bus 705, as well as the various components of the communication subsystem 730 (and/or the media by which the communications subsystem 730 provides communication with other devices). In an alternative set of embodiments, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700. These signals, which might be in the form of electromagnetic signals, acoustic signals, optical signals and/or the like, are all examples of carrier waves on which instructions can be encoded, in accordance with various embodiments of the invention.

The communications subsystem 730 (and/or components thereof) generally will receive the signals, and the bus 705 then might carry the signals (and/or the data, instructions, etc. carried by the signals) to the working memory 735, from which the processor(s) 705 retrieves and executes the instructions. The instructions received by the working memory 735 may optionally be stored on a storage device 725 either before or after execution by the processor(s) 710.

Figure 8:
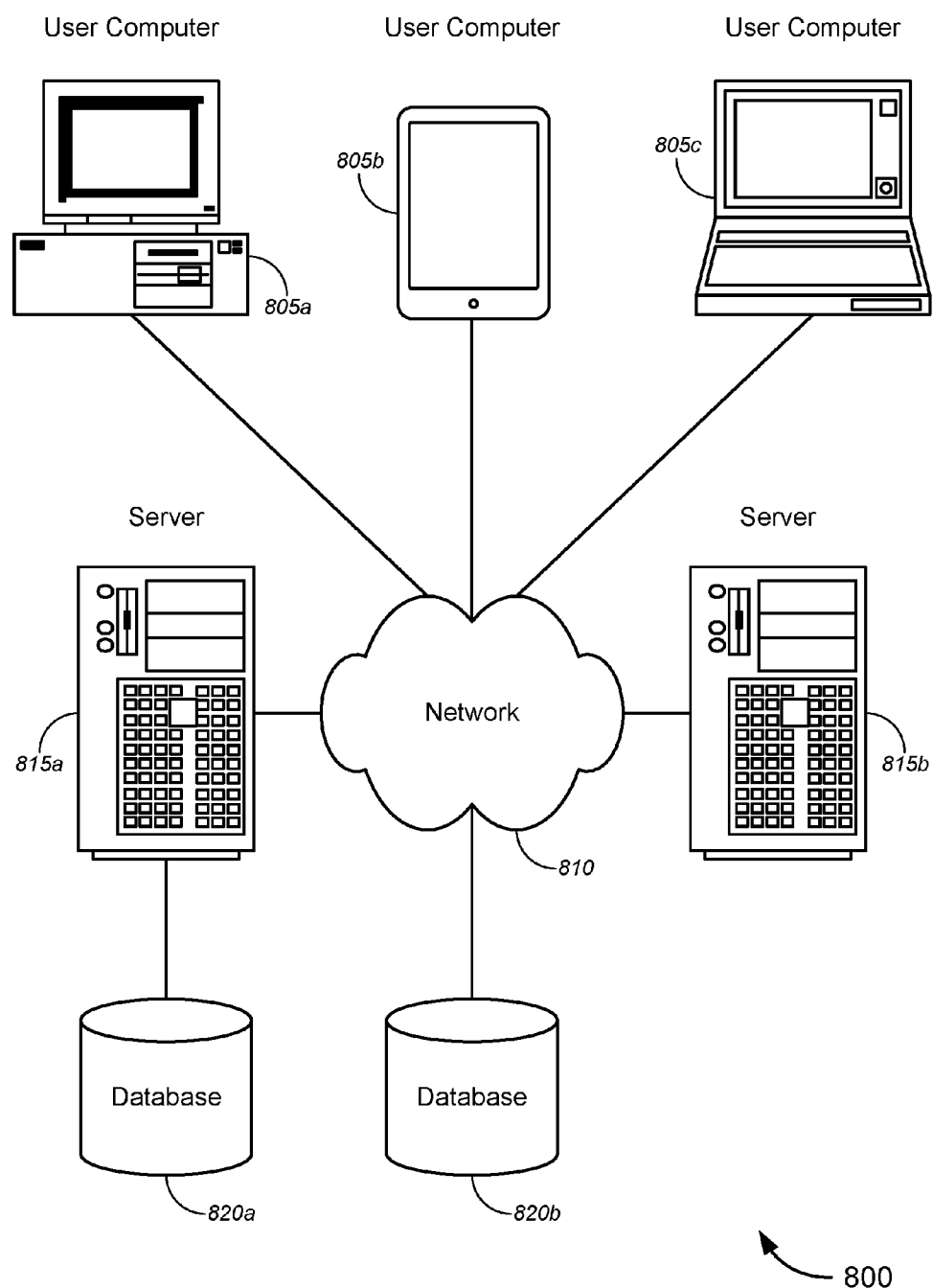
FIG. 8 is a block diagram illustrating a networked system of computers, which can be used in accordance with various embodiments.

As noted above, a set of embodiments comprises systems for providing computer security. FIG. 8 illustrates a schematic diagram of a system 800 that can be used in accordance with one set of embodiments to provide a networked environment in which a security system can be implemented (merely by way of example, with a management computer acting as a server, a sandboxed system acting as a user computer, etc.). The system 800 can include one or more user computers 805. A user computer 805 can be a general purpose personal computer (including, merely by way of example, desktop computers, tablet computers, laptop computers, handheld computers, and the like, running any appropriate operating system, several of which are available from vendors such as Apple, Microsoft Corp., and the like) and/or a workstation computer running any of a variety of commercially-available UNIX™ or UNIX-like operating systems. A user computer 805 can also have any of a variety of applications, including one or more applications configured to perform methods provided by various embodiments (as described above, for example), as well as one or more office applications, database client and/or server applications, and/or web browser applications. Alternatively, a user computer 805 can be any other electronic device, such as a thin-client computer, Internet-enabled mobile telephone, and/or personal digital assistant, capable of communicating via a network (e.g., the network 810 described below) and/or of displaying and navigating web pages or other types of electronic documents. Although the exemplary system 800 is shown with three user computers 805, any number of user computers can be supported.

Certain embodiments operate in a networked environment, which can include a network 810. The network 810 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network 810 can include a local area network ("LAN"), including, without limitation, a fiber network, an Ethernet network, a Token-Ring™ network, and/or the like; a wide-area network; a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks.

Embodiments can also include one or more server computers 815. Each of the server computers 815 may be configured with an operating system, including, without limitation, any of those discussed above, as well as any commercially (or freely) available server operating systems. Each of the servers 815 may also be running one or more applications, which can be configured to provide services to one or more clients 805 and/or other servers 815.

Merely by way of example, one of the servers 815 may be a web server, which can be used, merely by way of example, to process requests for web pages or other electronic documents from user computers 805. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 805 to perform methods of the invention.

The server computers 815, in some embodiments, might include one or more application servers, which can be configured with one or more applications accessible by a client running on one or more of the client computers 805 and/or other servers 815. Merely by way of example, the server(s) 815 can be one or more general purpose computers capable of executing programs or scripts in response to the user computers 805 and/or other servers 815, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™ and the like, which can process requests from clients (including, depending on the configuration, dedicated database clients, API clients, web browsers, etc.) running on a user computer 805 and/or another server 815. In some embodiments, an application server can create web pages dynamically for displaying the information in accordance with various embodiments, such as for displaying reports and/or the like. Data provided by an application server may be formatted as one or more web pages (comprising HTML, JavaScript, etc., for example) and/or may be forwarded to a user computer 805 via a web server (as described above, for example). Similarly, a web server might receive web page requests and/or input data from a user computer 805 and/or forward the web page requests and/or input data to an application server. In some cases a web server may be integrated with an application server.

In accordance with further embodiments, one or more servers 815 can function as a file server and/or can include one or more of the files (e.g., application code, data files, etc.) necessary to implement various disclosed methods, incorporated by an application running on a user computer 805 and/or another server 815. Alternatively, as those skilled in the art will appreciate, a file server can include all necessary files, allowing such an application to be invoked remotely by a user computer 805 and/or server 815.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 820. The location of the database(s) 820 is discretionary: merely by way of example, a database 820a might reside on a storage medium local to (and/or resident in) a server 815a (and/or a user computer 805). Alternatively, a database 820b can be remote from any or all of the computers 805, 815, so long as it can be in communication (e.g., via the network 810) with one or more of these. In a particular set of embodiments, a database 820 can reside in a storage-area network ("SAN") familiar to those skilled in the art. (Likewise, any necessary files for performing the functions attributed to the computers 805, 815 can be stored locally on the respective computer and/or remotely, as appropriate.) In one set of embodiments, the database 820 can be a relational database, such as an Oracle database, that is adapted to store, update, and retrieve data in response to SQL-formatted commands. The database might be controlled and/or maintained by a database server, as described above, for example.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
   receiving, at a computer system, data from one or more data feeds;
   obtaining, with the computer system, a binary object based on the data;
   loading, with the computer system, the binary object onto a sandboxed system;
   executing the binary object with the sandbox system, wherein the binary object that is executed comprises at least one of an email attachment, an application, a program, a media file, a web browser visiting a suspicious URL, a document, an executable file, or a compressed file;
   searching, with the computing system, for vulnerabilities in hardware or an operating system of the sandboxed system using a hardware debugger interface by feeding streams of random or malformed data to the sandboxed system;
   analyzing, with the computer system, operation of the sandboxed system to determine whether the binary object includes a malware payload; and
   based on a determination that the binary object includes a malware payload, generating, with the computer system, a report indicating that the binary object includes a malware payload.

2. The method of claim 1, wherein the sandboxed system is not a virtual machine.

3. The method of claim 1, wherein the sandboxed system is a bare metal computer.

4. The method of claim 1, wherein the sandboxed system employs a kernel-mode driver to monitor the sandbox system for suspicious events.

5. The method of claim 4, wherein the kernel-mode driver is obfuscated.

6. The method of claim 4, wherein at least one of the sandboxed system or the kernel-mode driver streams monitored data in real time.

7. The method of claim 6, wherein the kernel-mode driver analyzes, in real time, the monitored data being streamed, to identify suspicious behavior.

8. The method of claim 4, wherein the kernel-mode driver is dynamically loaded at startup to prevent evidence of a driver running at boot time.

9. The method of claim 8, wherein the kernel-mode driver creates a system thread then immediately exits execution.

10. The method of claim 9, wherein the system thread deletes the kernel-mode driver from a file system to remove evidence of the kernel-mode driver.

11. The method of claim 9, wherein the system thread monitors the sandboxed system to detect malware activity.

12. The method of claim 1, wherein the sandboxed system comprises a direct hardware interface with a motherboard of the sandboxed system, and wherein analyzing operation of the sandboxed system comprises analyzing output of the hardware interface.

13. The method of claim 12, wherein the hardware interface is built into the motherboard of the sandboxed system.

14. The method of claim 12, wherein the direct hardware interface is a manufacturer's debugger interface.

15. The method of claim 12, wherein the hardware interface is invisible to an operating system of the sandboxed system.

16. The method of claim 12, wherein the malware payload is a boot sector infector or a firmware-based rootkit, and wherein the method comprises detecting the malware payload though the hardware interface.

17. The method of claim 12, wherein analyzing operation of the sandboxed system comprises employing hardware breakpoints to pause operation of the sandboxed system.

18. The method of claim 12, wherein analyzing operation of the sandboxed system further comprises tracing an execution path of a processor of the sandboxed system.

19. The method of claim 12, wherein analyzing operation of the sandboxed system comprises:
   performing a first checksum of a firmware component of the sandboxed system before execution of the binary object;
   performing a second checksum of the firmware component during or after execution of the binary object; and
   comparing the first checksum with the second checksum to determine whether the firmware component has been modified.

20. The method of claim 19, wherein the firmware component is a BIOS.

21. The method of claim 12, wherein analyzing operation of the sandboxed system comprises pausing an operation associated with firmware reflashing.

22. The method of claim 12, wherein the sandboxed system comprises a custom firmware device that records all information written to or read from the firmware device during analysis of the operation of the sandboxed system.

23. The method of claim 1, wherein the sandboxed system comprises a simulated hard drive that is indistinguishable by an operating system of the sandboxed system from a physical hard drive.

24. The method of claim 23, wherein the simulated hard drive comprises a hard drive controller and a network controller in communication with the hard drive controller.

25. The method of claim 24, wherein the hard drive controller causes the network controller to perform network input/output in response to receiving disk input/output commands from the operating system of the sandboxed system.

26. The method of claim 23, wherein the simulated hard drive is built into or attached to the motherboard of the sandboxed system.

27. The method of claim 1, further comprising:
managing a boot environment for a plurality of sandboxed systems, the plurality of sandboxed systems comprising the sandboxed system.

28. The method of claim 27, wherein the boot environment includes a networked drive mountable by a network block device protocol, and wherein the sandboxed system does not include a physical hard drive.

29. The method of claim 28, wherein the network block device protocol is iSCSI.

30. The method of claim 28, wherein the networked drive employs a volume manager.

31. The method of claim 30, wherein the volume manager is ZFS.

32. The method of claim 30, wherein managing the boot environment comprises:
automatically resetting an operating system image to a default state in the volume manager; and
booting the sandboxed system from the networked drive using the default state of the operating system image.

33. The method of claim 32, wherein the binary object is included in the default state of the operating system image.

34. The method of claim 27, wherein managing the boot environment comprises selecting from among a plurality of operating system images, each of the plurality of operating system images configured to test a different potential malware scenario.

35. The method of claim 27, wherein managing the boot environment comprises restoring an image of an already booted instance of an operating system directly into RAM on the sandboxed system.

36. The method of claim 35, wherein the sandboxed system comprises a modified memory controller that reserves a portion of the installed RAM to store the image of the already booted instance of the operating system, and wherein the stored instance is not detectable by an operating system executing on the sandboxed system.

37. The method of claim 1, further comprising providing, with a Human Interface Device (HID) emulator physically connected with the sandboxed system, automated input that cannot be distinguished, by the executing binary object, from human input.

38. The method of claim 37, wherein the HID emulator is built into or attached to the motherboard of the sandboxed system.

39. The method of claim 1, wherein analyzing operation of the sandboxed system comprises capturing, at a gateway, incoming and/or outgoing communications of the sandboxed system and analyzing, with a computer, the incoming and/or outgoing communications.

40. The method of claim 39, wherein analyzing the outgoing communications comprises identifying a destination for outgoing communications and/or a source of incoming communications.

41. The method of claim 39, wherein analyzing the incoming and/or outgoing communication comprises decrypting at least a portion of the incoming and/or outgoing communication.

42. The method of claim 41, wherein decrypting at least a portion of the incoming and/or outgoing communication comprises performing a man-in-the-middle (MitM) attack on a destination for the outgoing communication.

43. The method of claim 39, wherein analyzing the outgoing communications comprises identifying one or more credentials used to connect to a command-and-control channel for the malware payload.

44. The method of claim 1, wherein analyzing operation of the sandboxed system comprises tracking behavior of the binary object.

45. The method of claim 44, wherein analyzing operation of the sandboxed system comprises documenting the behavior of the binary object.

46. The method of claim 44, wherein analyzing operation of the sandboxed system comprises comparing the behavior of the binary object with one or more malware signatures.

47. The method of claim 44, wherein analyzing operation of the sandboxed system comprises analyzing the behavior of the binary object against one or more heuristics.

48. The method of claim 1, further comprising:
creating a malware identification based on a determination that the binary object includes a malware payload.

49. The method of claim 48, further comprising:
distributing the malware identification to a plurality of networking devices to immunize the plurality of networking devices against the malware payload.

50. The method of claim 1, wherein the one or more data feeds comprises email collected from a honey pot.

51. The method of claim 1, wherein the one or more data feeds comprises URLs collected from web browsing operations.

52. The method of claim 51, wherein analysis of the operation of the sandboxed system comprises identifying drive-by malware associated with one or more of the URLs.

53. The method of claim 1, wherein the one or more data feeds comprises data collected from one or more sensors in a customer network.

54. The method of claim 53, wherein the one or more sensors comprises a sensor in communication with or integrated with a mail server in the customer network.

55. The method of claim 53, wherein the one or more sensors comprises a sensor in communication with or integrated with a web proxy in the customer network.

56. The method of claim 53, wherein the one or more sensors comprises a sensor in communication with or integrated with one or more network or system log aggregators.

57. The method of claim 53, wherein the one or more sensors comprises a sensor in communication with or integrated with a System Information and Event Manager (STEM) in the customer network.

58. The method of claim 53, wherein the one or more sensors comprises a sensor in communication with or integrated with an antivirus agent on a client computer in the customer network.

59. A system, comprising:
a plurality of sandboxed computers, each comprising a main system board;
a management computer in communication with the plurality of sandboxed computers, the management computer comprising:
one or more processors; and
a computer readable medium in communication with the one or more processors, the computer readable medium having encoded thereon a set of instructions executable by the computer system to perform one or more operations, the set of instructions comprising:
instructions for downloading a binary object on to each of one or more of the plurality of sandboxed computers, such that each of the one or more of the plurality of sandboxed computers executes or opens the binary object, wherein the binary object that is executed comprises at least one of an email attachment, an application, a program, a media file, a web browser visiting a suspicious URL, a document, an executable file, or a compressed file;

instructions for searching for vulnerabilities in hardware or an operating system of the sandboxed system using a hardware debugger interface by feeding streams of random or malformed data to the sandboxed system;

instructions for analyzing operation of the sandboxed system to determine whether the binary object includes a malware payload; and instructions for, based on a determination that the binary object includes a malware payload a report indicating that the binary object includes a malware payload.

60. The system of claim 59, further comprising one or more sensors installed in one or more customer networks, the one or more sensors configured to provide data feeds to the management computer, wherein the binary object is obtained from one of the data feeds.

* * * * *